United States Patent

Beardmore

[11] Patent Number: 6,092,423
[45] Date of Patent: Jul. 25, 2000

[54] TUNNEL PICK-OFF VIBRATING RATE SENSOR

[75] Inventor: Geoffrey Beardmore, Cheltenham, United Kingdom

[73] Assignee: Smiths Industries Public Limited Company, London, United Kingdom

[21] Appl. No.: 09/068,535

[22] PCT Filed: Nov. 20, 1996

[86] PCT No.: PCT/GB96/02858

§ 371 Date: May 13, 1998

§ 102(e) Date: May 13, 1998

[87] PCT Pub. No.: WO97/20189

PCT Pub. Date: Jun. 5, 1997

[30] Foreign Application Priority Data

Nov. 28, 1995 [GB] United Kingdom .................. 9524241

[51] Int. Cl.⁷ .................................................. G01L 11/00
[52] U.S. Cl. .................................................. 73/704
[58] Field of Search ................. 73/702, 704, 504.07, 73/504.08, 504.12; 216/2; 310/316, 317, 326

[56] References Cited

U.S. PATENT DOCUMENTS

| 4,267,731 | 5/1981 | Jacobson | 73/505 |
| 5,485,053 | 1/1996 | Baz | 310/326 |
| 5,922,212 | 7/1999 | Kano et al. | 216/2 |

Primary Examiner—William Oen
Attorney, Agent, or Firm—Pollock, Vande Sande & Amernick

[57] ABSTRACT

A rate sensor has a tine cut from a silicon substrate and resiliently mounted by two integral flexure beams. An electrostatic actuator drives the tine to vibrate in its plane. The tine supports two tunnel pick-offs in the form of spikes projecting from the tine, the tips of the spikes being positioned below a pick-off plate. In operation, the plate is moved down until it is closely spaced from the spikes and a tunneling current is produced. One spike is positioned below a recess so that there is a sharp fall in current when the spike passes beneath the recess, this signal being used to indicate the amplitude and frequency of vibration. The tunneling current output from the other spike indicates the separation from the plate. Rotation of the sensor about an axis y in the plane of vibration of the tine causes displacement of the tine at right angles, which is sensed by the tunnel pick-off.

9 Claims, 4 Drawing Sheets

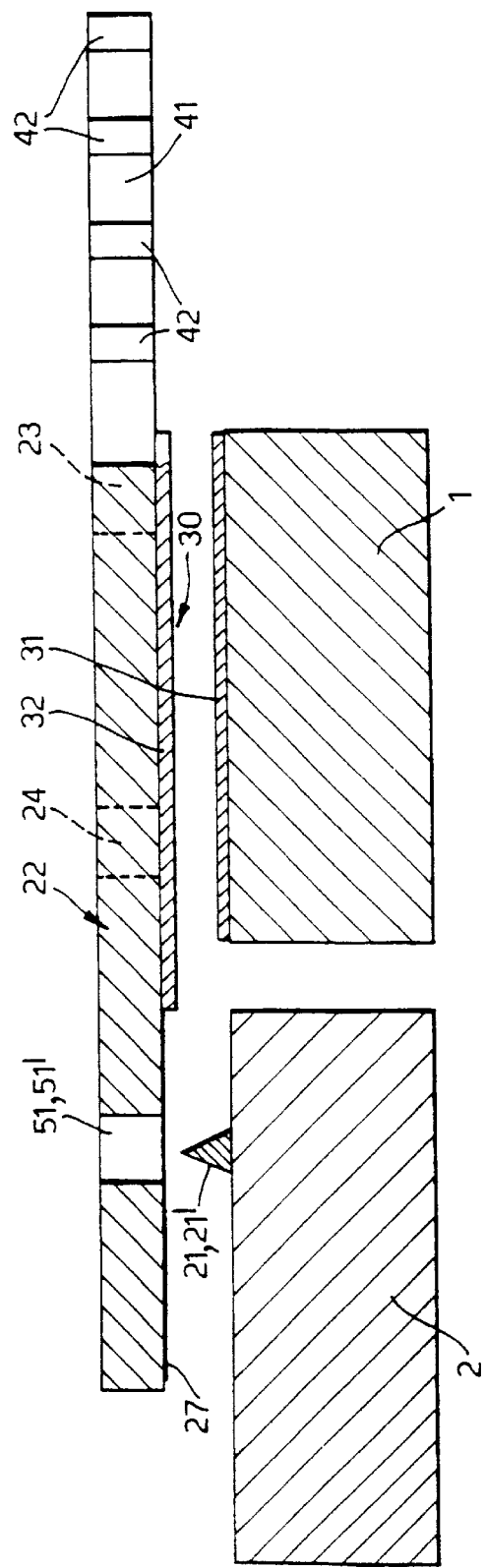
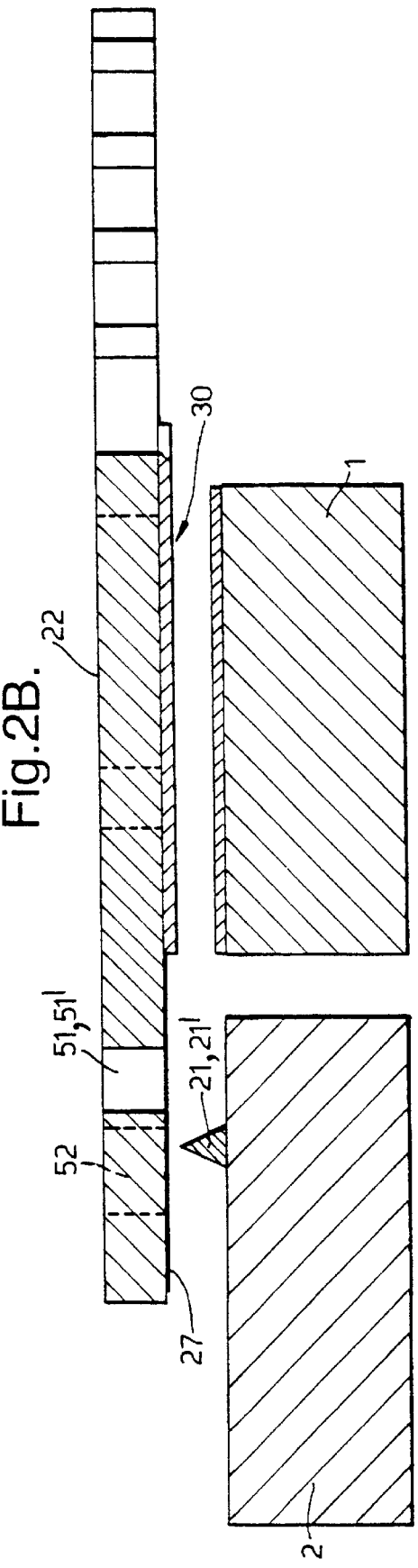

TUNNEL PICK-OFF VIBRATING RATE SENSOR

FIELD OF THE INVENTION

This invention relates to rate sensors of the kind including a resiliently-mounted element, an actuator that vibrates the element in a first plane, and a displacement sensor responsive to displacement of the vibrating element in a sensing direction normal to the first plane caused by rotation of the sensor about an axis in the plane and at right angles to the sensing direction.

BACKGROUND OF THE INVENTION

Vibrating element rate sensors, such as tuning fork gyros, have an element driven to vibrate in one plane. When the sensor is subject to rotation about an axis parallel to the vibration plane, a force is produced on the vibrating element orthogonal to the axis of rotation and the plane of vibration. This tends to cause deflection of the element, which is sensed by a suitable sensor, such as a capacitive pick-off.

SUMMARY OF THE INVENTION

It is an object of the present invention to provide an improved rate sensor.

According to one aspect of the present invention there is provided a rate sensor of the above-specified kind, characterized in that the displacement sensor includes a tunnel pick-off having a first part located on the vibrating element and a second part separate from the vibrating element, one part including a spike and the other part including a surface closely spaced from the tip of the spike.

The spike is preferably mounted on the vibrating element, the surface being on the second part. The tunnel pick-off may include two spikes, the surface having a recess located above one of the spikes, the output of the spike located beneath the recess being utilized to provide an output representative of vibration of the element. The sensor may include an actuator for maintaining constant average separation between the first part and the second part of the pick-off. The sensor may include an actuator so that the first and second parts can be displaced relative to one another from a position prior to use in which each spike is protected. The surface may have a recess positioned above each spike prior to use. The vibrating element is preferably a plate machined from a silicon substrate, the substrate supporting the second part of the tunnel pick-off. The actuator that vibrates the element in the first plane is preferably an electrostatic actuator. The vibrating element may have two flexure arms, the vibrating element being tuned by removing material from a surface of the arms.

According to another aspect of the present invention there is provided a two-axis inertial rate sensor system including four pairs of rate sensors according to the above one aspect of the invention, characterized in that the rate sensors in each pair are mirror images of one another.

Other aspects of the present invention will become apparent from the following description, by way of example, of a two-axis inertial rate sensor system, including sensors according to the present invention, with reference to the accompanying drawings, in which:

BRIEF DESCRIPTION OF THE DRAWINGS

FIGS. 2A and 2B are sectional side elevation views, to an enlarged scale, of the pick-off assembly along the line II—II in FIG. 1, showing the assembly at a rest and operational state respectively;

DETAILED DESCRIPTION OF THE DRAWINGS

Figure 1:
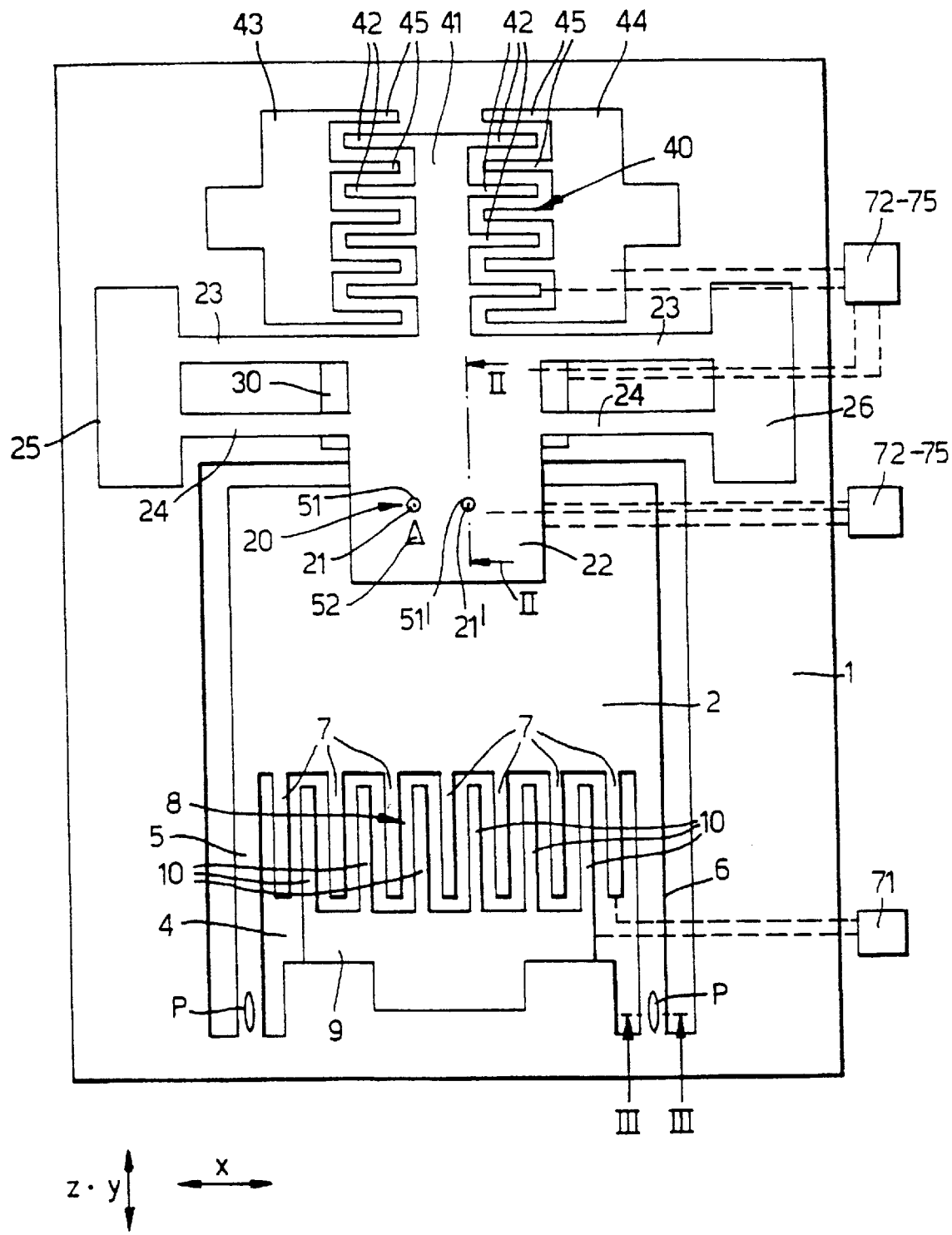
FIG. 1 is a plan view of the sensor.
Figure 3:
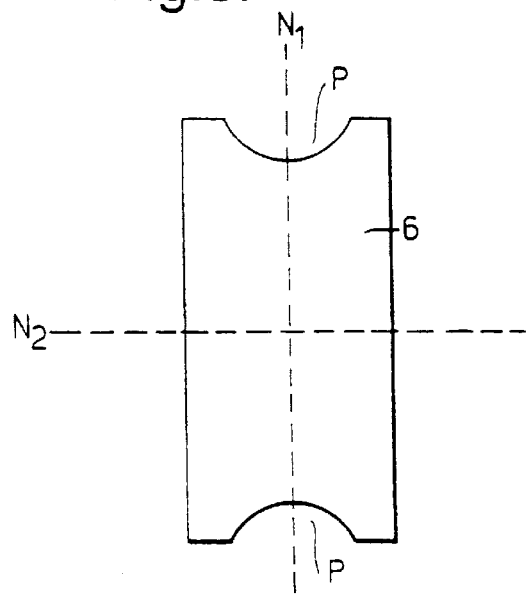
FIG. 3 is a sectional side elevation, to an enlarged scale, showing a part of the vibrating element along line III—III of FIG. 1.

With reference first to FIGS. 1 to 3, the sensor includes a silicon wafer substrate 1 of rectangular shape having a tine 2. The tine 2 is formed integrally from the wafer by using microengineering techniques, such as photolithography or micromachining, to cut an aperture 3 of inverted U shape. The tine 2 is located in the lower half of the wafer 1, the aperture 3 extending around three sides of the tine. A second aperture 4 is cut laterally across the middle of the bottom of the tine 2 to leave two vertical flexure beams 5 and 6 providing the sole support for the tine in the wafer 1. The beams 5 and 6 are of rectangular section having their shorter sides parallel to the plane of the wafer, as shown in FIG. 3. Between the beams 5 and 6, the tine has seven parallel teeth 7 extending vertically down and forming one half of an electrostatic comb actuator 8. The other half of the actuator 8 is provided by an assembly 9 mounted on the wafer 1 itself below the tine 2, which has six teeth 10 projecting upwardly between the teeth 7. The actuator 8 is connected to a drive unit 71, which applies an oscillating voltage between the two sets of teeth 7 and 10 so that the tine 2 is driven to vibrate in the direction "x" in the plane of the tine, at right angles to the length of the beams 5 and 6. More particularly, the teeth 7 are energized so that each tooth in the same comb has the opposite polarity from the adjacent tooth (+, −, +, − and so on). Also, the teeth 8 are similarly energized so that they each have opposite polarities from adjacent teeth in the same comb. In this way, the positively-charged teeth 7 are attracted to the negatively-charged teeth 8, and the negatively-charged teeth 7 are attracted to those teeth 8 that are positively charged, causing movement of the tine 2 in one direction, at right angles to the length of the teeth. Reversing the polarity on one set of teeth causes the tine 2 to move in the opposite direction.

The upper end of the wafer 1 supports a tunnel pick-off assembly 20 and an out-of-plane actuator assembly 30. A part of the tunnel pick-off assembly 20 is provided by two tunnel nanotips or spikes 21 and 21' projecting upwardly at right angles to the surface of the tine 2, side-by-side close to its upper edge. The spikes 21 and 21' are of conical shape and typically have a tip radius of about 5 nm. A tunnel pick-off is defined here as being one having a sharp discontinuity or spike that strips electrons from an adjacent surface when brought into close proximity, to produce a current that is proportional to the separation between the surface and the discontinuity. More than two spikes can be provided with only the outputs from the highest spikes being utilized. The spikes 21 and 21' may be formed by any conventional technique, such as by deposition through a stand-off mask or by laser-induced chemical vapor deposition (LICVD). The spikes may be of a diamond material. The other part of the pick-off assembly 20 is provided by a plate 22 extending parallel to the wafer 1 and closely spaced above it. The plate 22 is of rectangular shape, overlapping the upper region of the tine 2 on which the spikes 21 and 21' are located. The plate 22 has a conductive surface 27 on its underside and two small circular holes or similar recesses 51 and 51' through its thickness, which are positioned above the tunnel spikes 21 and 21' respectively when the plate 22 is in its rest position before use, as shown in FIG. 2a The pick-off plate 22 also has a hole or recess 52, of triangular shape, located a short distance below the left-hand circular hole 51. The circular holes 51 and 51' may be used as the stand-off masks through which the spikes 21 and 21' are deposited. The spikes 21 and 21' and the conductive underside 27 of the pick-off plate 22 are electrically connected to an electronics unit 72 to 75 functioning as a tunnel pick-off unit by which a voltage can be applied between the spikes and the plate.

Two resilient suspension arms 23 and 24 project laterally on either side of the plate 22 and are terminated by short pillars 25 and 26 respectively attached to the upper surface of the wafer 1. The natural frequency of the pick-off plate suspension is selected to be higher than that of the tine 2. The suspension arms 23 and 24 hold the plate 22 above the tine 2 but allow it to be deflected up or down normal to the plane of the wafer along an axis "z", by the action of the out-of-plane actuator assembly 30.

The out-of-plane actuator assembly 30 is of an electrostatic kind and comprises a lower metal electrode 31, mounted on the upper surface of the wafer 1 below the plate 22, and an upper electrode 32 mounted on the underside of the plate, directly above the lower electrode. The electrodes 31 and 32 are connected to the electronics unit 72 to 75, which acts as an out-of-plane actuator drive unit. The suspension arms 23 and 24 also allow the plate 22 to be displaced along a line parallel to the plane of the wafer 1 and at right angles to the arms, shown as the "y" axis. Displacement of the plate 22 along the y axis, parallel to the plane of the wafer 1, is effected by means of an in-plane electrostatic actuator assembly 40.

The in-plane actuator assembly 40 comprises a first part formed by a part of the plate 22 itself, in the form of an actuator arm 41 projecting upwardly along the y axis, the arm having four fingers 42 projecting outwardly from each side. The other part of the in-plane actuator assembly 40 comprises two sub-assemblies 43 and 44, one on each side of the arm 41. Each sub-assembly 43 and 44 has five fingers 45 extending inwardly towards one another, parallel to the x axis, which are interlaced with the fingers 42 on the arm 41. The fingers 42 and 45 are electrically connected to the electronics unit 72 to 75, which also serves as an in-plane actuator drive unit. The electronics unit 72 to 75 can apply a voltage between the fingers 42 and 45 to cause the plate 22 to be displaced either up or down along the y axis, at right angles to the length of the fingers, in the same way as with the tine actuator 8.

Before the sensor is initially started up, the pick-off plate 22 is spaced above the tip of the spikes 21 and 21' by a short distance and the spikes are aligned with the holes 51 and 51', as shown in FIG. 2A. In this way, the spikes 21 and 21' are protected, because, even if the plate 22 were deflected down towards the tine 2, it would not contact the spikes. On start up, a voltage is applied to the in-plane actuator assembly 40 sufficient to pull the pick-off plate 22 upwardly along the y axis, away from the tine 2, by a distance sufficient to move the protective holes 51 and 51' away from the spikes 21 and 21' and to position the triangular hole 52 directly above the left-hand spike 21, as shown in FIG. 2B. In this position, the right-hand spike 21' is located below a plane surface provided by the underside 27 of the plate 22. A drive voltage is then applied to the tine actuator assembly 8 so that the tine 2 is driven to vibrate in the plane of the wafer 1 along the axis x. The actuator drive unit 71 is self tuning so that the tine 2 is driven at its resonant frequency at some nominal amplitude initially. A ramp voltage is then applied by the electronics unit 72 to 75 to the out-of-plane actuator assembly 30, so that the pick-off plate 22 is gradually moved down parallel to the z axis, towards the upper surface of the oscillating tine 2. As the lower surface of the pick-off plate 22 comes closer to the tip of the right-hand spike 21', current begins to flow because of the tunnelling effect. The magnitude I of the current is given by the expression:

$$I \, Ve^{-\alpha V \phi s}$$

Where V=bias voltage $\phi$=tunnel barrier height $$\alpha = 1.025 \, (\text{Å}^{-1} \text{eV}^{-\frac{1}{2}})$$

s=separation

Sensitivity of the sensor is about one order of magnitude for each Å change in separation.

As the tine 2 moves backwards and forwards, the tip of the spike 21' will move across a small arc of the underside of the plate 22 and the current will vary because of imperfections in the surface, even down to the atomic scale. The electronics unit 72 to 75 acts as a pick-off unit to monitor the mean current produced as the plate 22 is brought closer to the tip of the spike 21' and, when this reaches a predetermined value, corresponding to a predetermined separation, the ramp voltage is terminated and a servo voltage is applied so that this average separation is maintained. The separation between the tip of the spikes and the surface 27 of the plate 22 is of the same order as the tip radius, that is, about 5 nm. The left-hand spike 21 produces a current output in the same way but, because this spike is located below the triangular hole 52, there will be a sharp drop in current when the spike passes under the hole. The electronics unit 72 to 75 monitors this output to derive a measure of the amplitude and frequency of oscillation of the tine 2—this is used to servo control the magnitude of the signal applied by the in-plane actuator assembly 30.

When there is no rate input to the sensor, the tine 2 vibrates in the plane of the wafer 1 at a constant servo-controlled amplitude. The pick-off output current corresponds to the average servo-controlled gap between the tine 2 and the pick-off plate 22.

Immediately an input rate is applied about the y axis, parallel to the plane of the wafer 1 and at right angles to the linear vibration of the tine 2, the tine will experience an oscillating Coriolis force tending to cause it to vibrate in a direction normal to the plane of the wafer, along the z axis. The frequency of this Coriolis force will be the same as the drive frequency of the tine. These minute oscillations are sensed by the pick-off assembly 20 and appear as a modulation of the mean tunnel current. The amplitude of the modulation corresponds to the magnitude of the input rate. The phase of the modulation, compared with the phase of the drive voltage or the amplitude output of the pick-off 20, indicates the sense of the input rate, positive or negative.

Alternatively, it may be possible to have a fully closed loop system where the tunnel gap is servoed to maintain a constant tunnel current; the out-of-plane actuator servo current then becomes a measure of input rate.

Because the tunnel pickoff is sensitive to very small distances, its output will include noise caused by the surface discontinuities on the underside of the pick-off plate 22. However, the tunnel pick-off will trace the same path across the plate 22 for each oscillation, so the noise is cyclic and repeated, enabling it to be removed by digital signal processing or active filtering techniques.

The Coriolis force is directly proportional to the linear velocity of the tines and this is proportional to the amplitude of vibration, so the sensitivity of the sensor can be readily altered by adjusting the amplitude of vibration of the tine 2 to accommodate different input rates. The high sensitivity of the tunnel pick-off means that only very small vibration in the sensing plane is needed and that the sensing amplitude can be considerably smaller than the drive amplitude, thereby minimizing non-linearities of response. It also means that the drive amplitudes can be relatively small, minimizing hysteresis and coupling losses to the surrounding structure.

Figure 4:
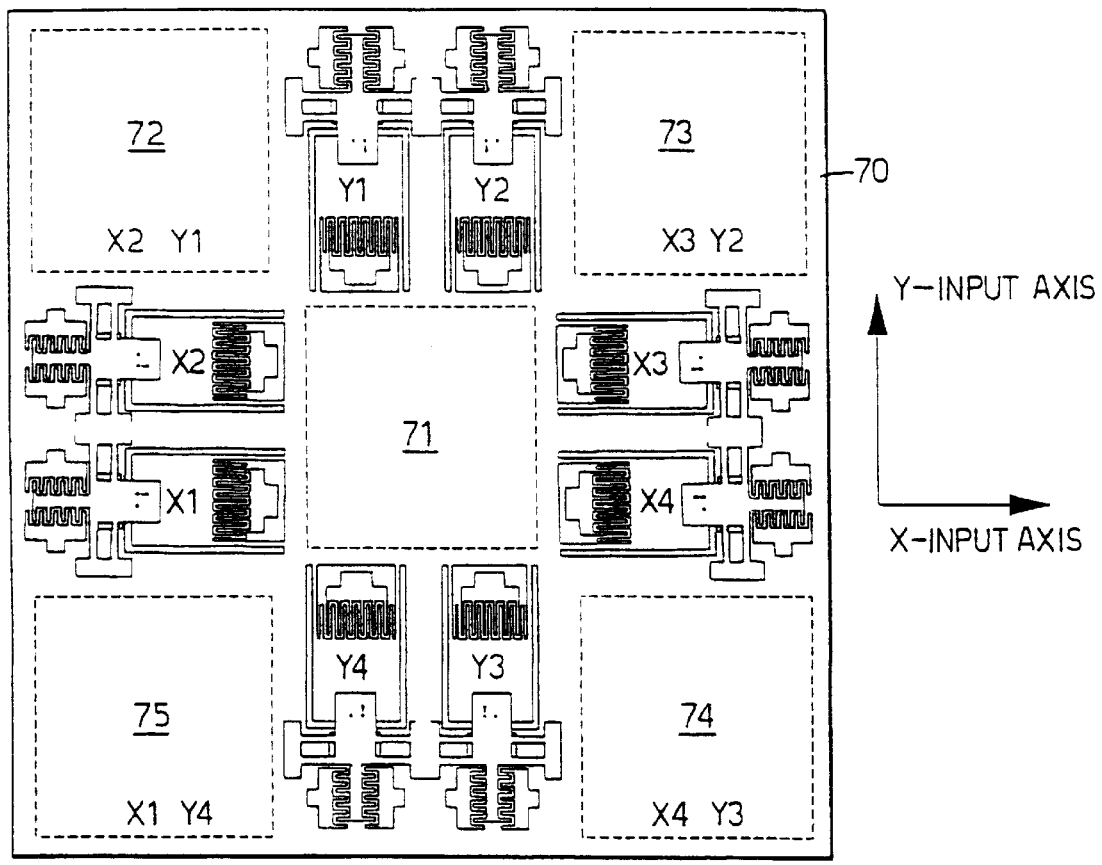
FIG. 4 is a plan view of the system.

The inertial rate system shown in FIG. 4 comprises four pairs of sensors indicated by the labels Y1 to Y4 and X1 to X4. Each sensor in a pair is a mirror image of the other sensor in the pair. The eight sensors are mounted on a square substrate 70, about 2 cm square, together with the five associated electronics units 71 to 75. The sensors and electronics units are preferably formed directly in the substrate, with the wafer 1 being a part of a silicon substrate, although they could be formed separately and subsequently mounted on the substrate. Each pair of sensors Y1 and Y2, Y3 and Y4, X1 and X2, and X3 and X4 is mounted centrally along the sides of substrate 70 with the unit 71 located centrally and the other units 72 to 75 located in opposite corners. The substrate could have additional slots and apertures to provide a flexible mounting of the sensors and thereby mechanically isolate them from the outside world. The central unit 71 contains electronics for driving the tines 2 of all eight sensors, the other four units 72 to 75 contain electronics for driving the in-plane actuator 40, the out-of-plane actuator 30 and for processing the outputs of the pick-off assemblies 20 and the out-of-plane actuators 30 of adjacent pairs of sensors. The sensors are arranged so that both the x and y axis inputs have four inertially-balanced sensors with four tines vibrating in antiphase so that the tunnel pick-offs can provide a differential output signal with a good common mode rejection. This allows independent rate detection about two orthogonal axes.

For maximum sensitivity, the resonant frequency of all eight tines in the system should be identical both in the plane of driven vibration and at right angles to this, in the sensing plane. To achieve this, the tines are initially machined to give them a natural frequency slightly higher in the sensing plane than in the driven plane. The tines are then frequency trimmed by ablating a small amount of material from the upper or lower surface, or both surfaces, of each flexure beam 5 and 6, close to a point P of maximum stress. This removal of material may be carried out by a focussed electron beam or laser. As shown in FIG. 3, the flexure beams 5 and 6 have a neutral axis $N_1$ for in-plane vibration that extends vertically out of the plane centrally across the width of the beam, and a neutral axis $N_2$ for out-of-plane vibration that extends horizontally centrally across the thickness of the beam. Removal of the material from the upper or lower surface of the beams 5 and 6 will have a greater effect on the resonant frequency in the driven (in-plane) direction than on the frequency in the sensing (out-of-plane) direction, because the material removed is very close to the neutral axis in the driven plane but is at some distance from the neutral axis in the sensing plane. Tuning is achieved by simultaneously exciting the tines 2 in both directions and monitoring their frequencies via their respective tunnel pick-off assemblies 20. The tines 2 are excited in the out-of-plane direction by applying an intermittent drive signal to the underside of the pick-off plate 22, with the out-of-plane actuator 30 being used to cancel out the reaction force and prevent the pick-off plate going into resonance. The beams are automatically trimmed until the two resonant frequencies become equal.

Figure 5:
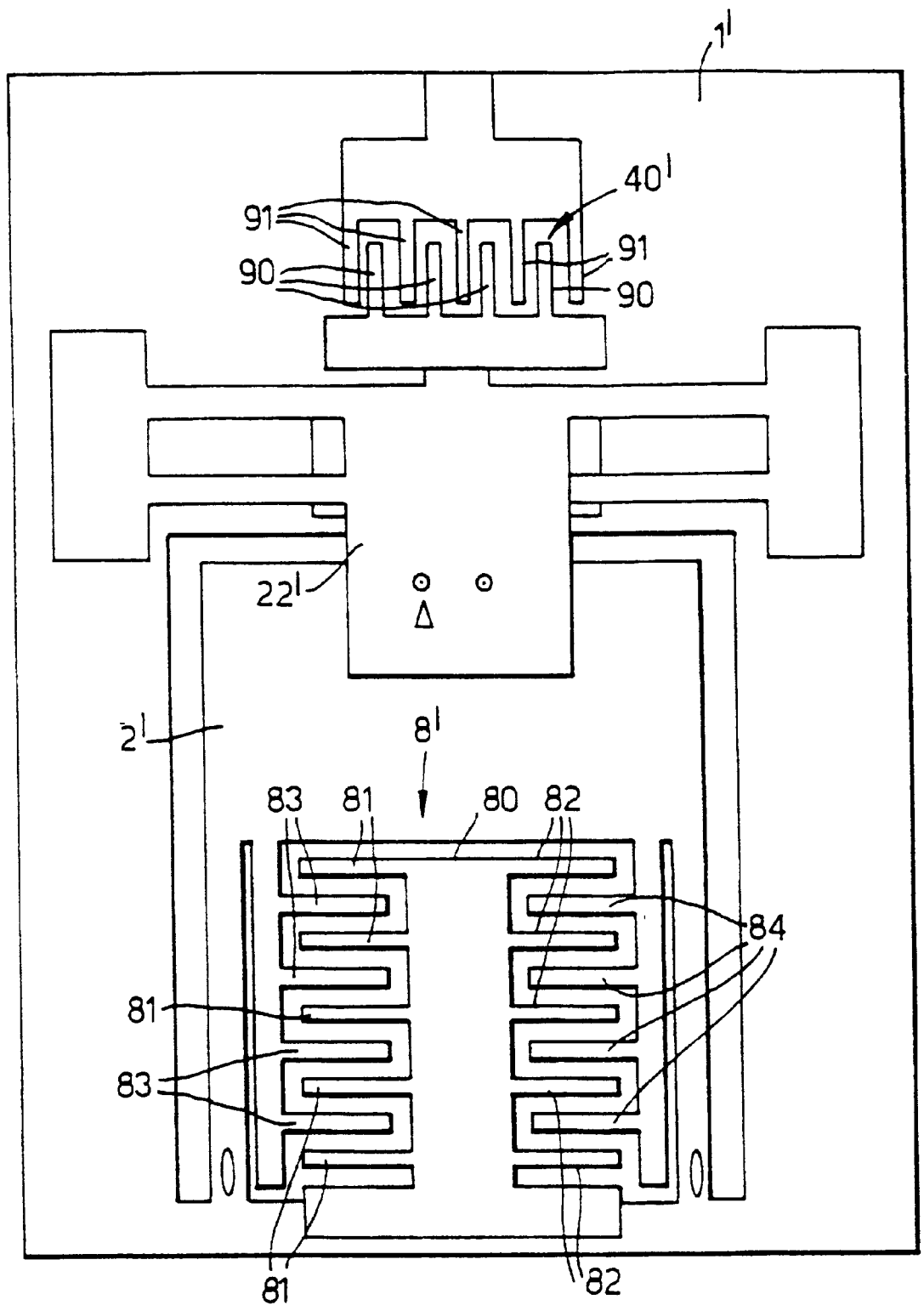
FIG. 5 is a plan view of a sensor with alternative actuators.

The electrostatic actuators 8 and 40 described above have two combs with interdigitated fingers or teeth, one comb moving at right angles to the length of the fingers or teeth. FIG. 5 shows a sensor with a tine actuator 8' and an in-plane actuator 40' where movement is effected parallel to the length of the fingers or teeth. The tine actuator 8' has a central structure 80 fixed on the wafer 1', with a set of five teeth 81 projecting to the left and five teeth 82 projecting to the right. These two sets of teeth 81 and 82 are interdigitated with respective pairs of teeth 83 and 84 on the tine 2', which extend at right angles to the length of the tine. Oscillation of the tine 2' is produced by applying a voltage of the same polarity to all the tine teeth 83 and 84, and by applying a voltage of one polarity to the teeth 81, on one side of the fixed structure 80, and of the opposite polarity to the teeth 82 on the opposite side of the fixed structure. For example, if the teeth 83 and 84 were to have a positive charge, the teeth 81 a positive charge and the teeth 82 a negative charge, the tine 2' would move to the right. By appropriately changing the energization of the teeth, oscillation is produced.

Similary, the in-plane actuator 40' has a set of teeth 90 on the pick-off plate 22' projecting parallel to the direction of desired displacement of the plate. A corresponding set of fixed teeth 91 is mounted on the wafer 1' and is interdigitated with the teeth 90. By applying different voltages to the two sets of teeth 90 and 91, the plate 22' can be pulled in its plane towards the actuator 40'.

In practice, the sensor will usually have a greater number of interdigitated teeth or fingers than described.

The sensors of the present invention could be used in a system for measuring acceleration rather than rate.

The sensors of the present invention can be made at low cost by microengineering techniques and are susceptible to automated manufacture, trimming and testing. The sensors are very compact and can have a high sensitivity.

What is claimed is:

1. A rate sensor including a resiliently-mounted element a first actuator that vibrates the element in a first plane (x), a displacement sensor responsive to displacement of the vibrating element in a sensing direction (z) normal to the first plane caused by rotation of the sensor about an axis (y) in the plane and at right angles to the sensing direction, a tunnel pick-off having a first part located on the vibrating element and a second part separate from the vibrating element, one part including a spike and the other part including a surface closely spaced from the tip of the spike, the sensor including a second actuator so that the first and second parts can be displaced relative to one another from a position prior to use in which the spike is protected.

2. A rate sensor according to claim 1, wherein the surface has a recess positioned above the spike prior to use.

3. A rate sensor according to claim 1 or 2, wherein the spike is mounted on the vibrating element and the surface is on the second part.

4. A rate sensor according to claim 1 wherein the tunnel pick-off includes two spikes, the surface has a recess located above one of the spikes, and the output of the spike located beneath the recess is utilized to provide an output representative of vibration of the element.

5. A rate sensor according to claim 1 wherein the sensor includes a third actuator for maintaining a constant average separation between the first part and the second part of the pick-off.

6. A rate sensor according to claim 1 wherein of the preceding claims, the vibrating element is a plate machined from a silicon substrate, and the substrate supports the second part of the tunnel pick-off.

7. A rate sensor according to claim 1 wherein the first actuator that vibrates the element in the first plane (x) is an electrostatic actuator.

8. A rate sensor including a resiliently-mounted element, an actuator that vibrates the element in a first plane (x), a displacement sensor responsive to displacement of the vibrating element in a sensing direction (z) normal to the first plane caused by rotation of the sensor about an axis (y) in the plane and at right angles to the sensing direction, a tunnel pick-off having a first part located on the vibrating element and a second part separate from the vibrating element, one part including a spike and the other part including a surface closely spaced from the tip of the spike, the vibrating element having a flexure arm, and the vibrating element having been tuned by removal of material from a surface of the arm.

9. A two-axis inertial rate sensor system including four pairs of rate sensors according to claim 1 wherein the rate sensors in each pair (Y1 and Y2, Y3 and Y4, X1 and X2, and X3 and X4) are mirror images of one another.

* * * * *